No. 801,481. PATENTED OCT. 10, 1905.
L. C. SHIPLEY.
CANOPY FRAME FOR AUTOMOBILES.
APPLICATION FILED JAN. 18, 1905.
2 SHEETS—SHEET 2.
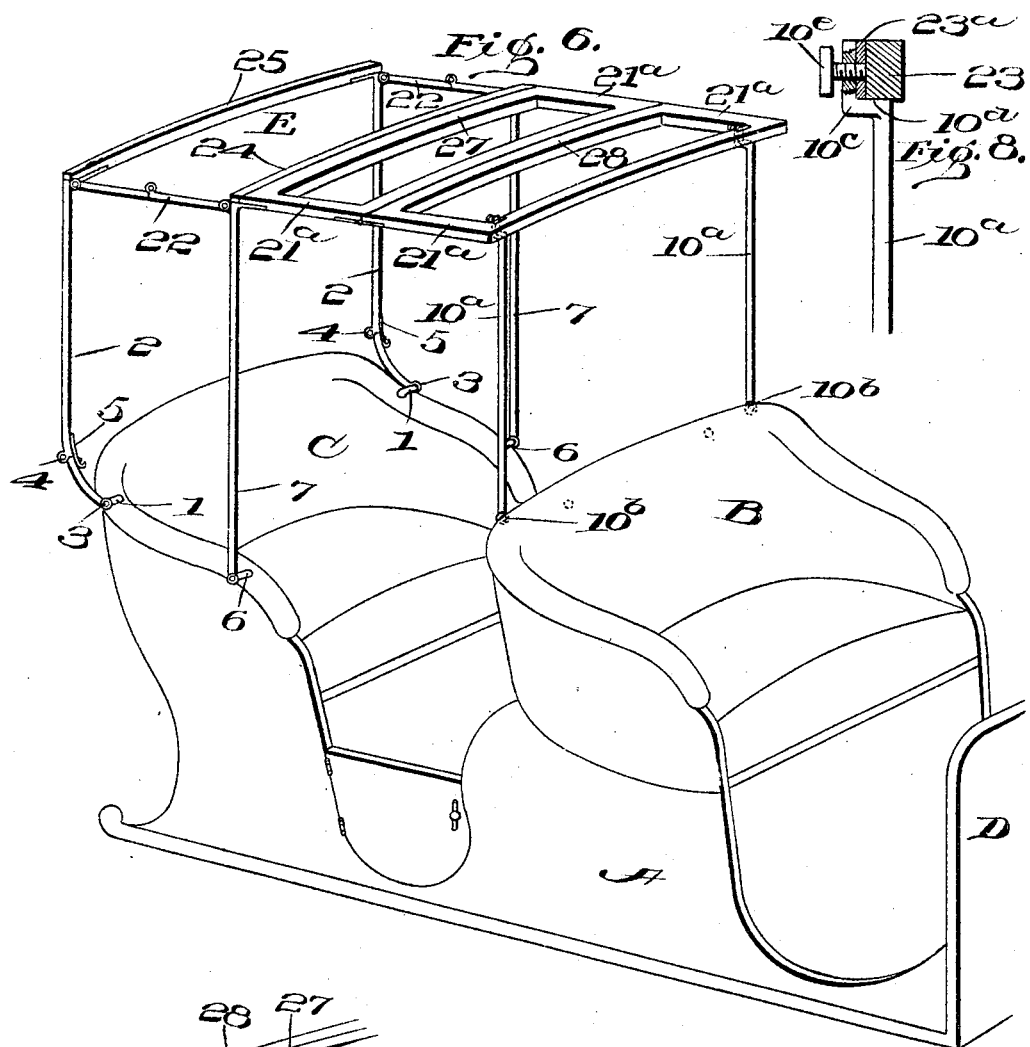
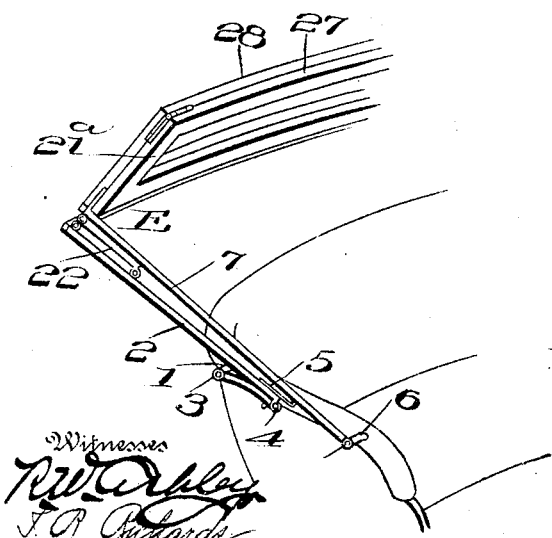
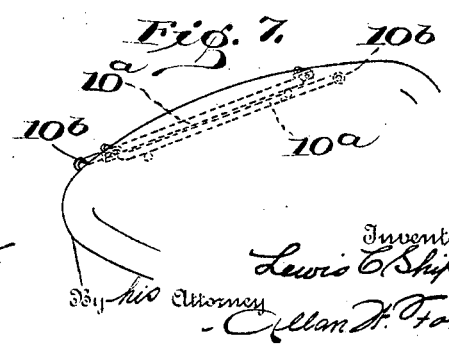
Witnesses
Inventor
Lewis C. Shipley
By his Attorney

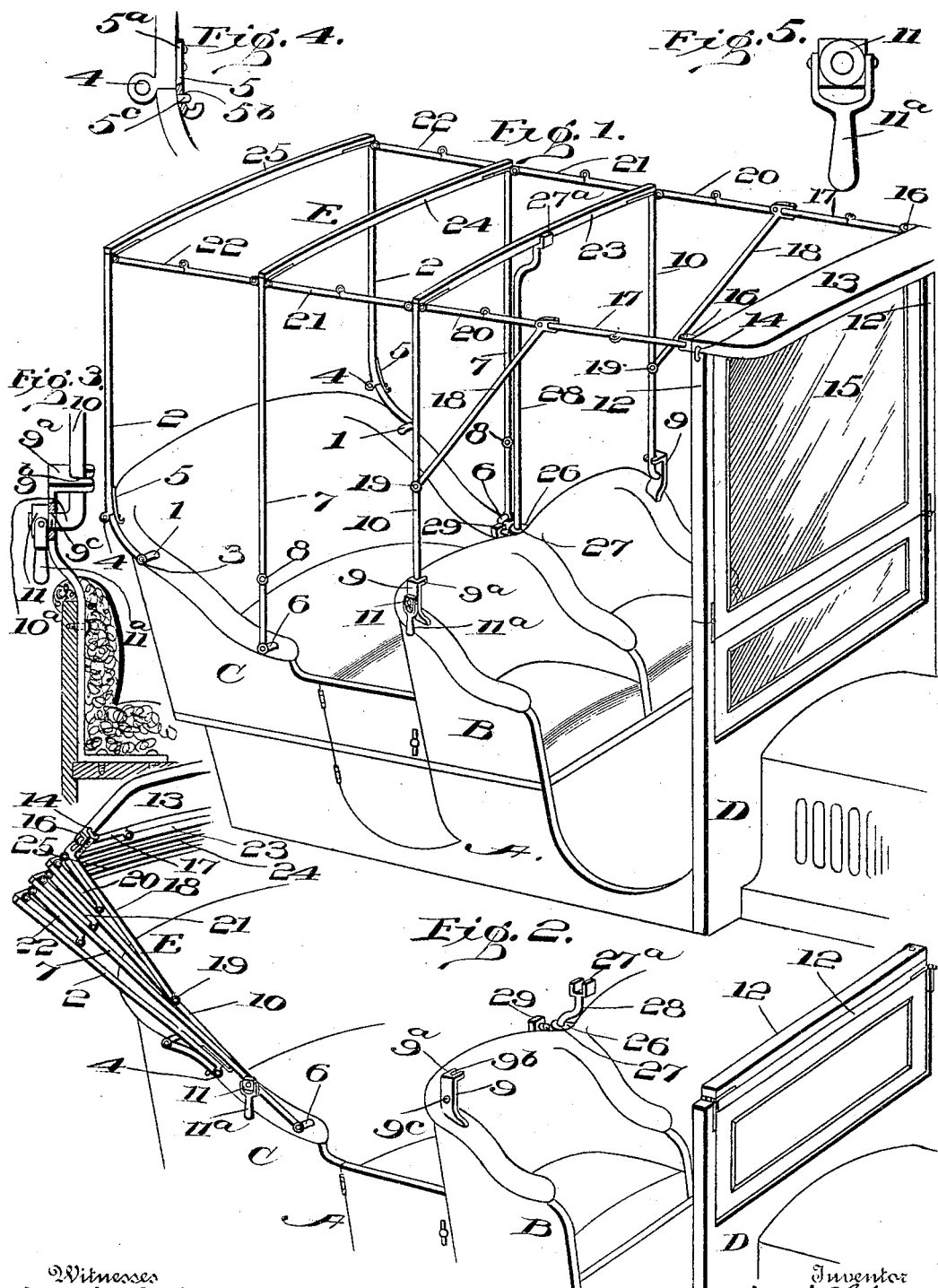

UNITED STATES PATENT OFFICE.

LEWIS C. SHIPLEY, OF NEW YORK, N. Y.

CANOPY-FRAME FOR AUTOMOBILES.

No. 801,481.          Specification of Letters Patent.          Patented Oct. 10, 1905.

Application filed January 18, 1905. Serial No. 241,587.

*To all whom it may concern:*

Be it known that I, LEWIS C. SHIPLEY, residing at New York, in the county of New York and State of New York, have invented certain new and useful Improvements in Canopy-Frames for Automobiles, of which the following is a full, clear, and exact description, such as will enable others skilled in the art to which it appertains to make and use the same.

This invention relates to improvements in canopy-frames for automobiles.

The object of my invention is to produce such a frame as may be easily folded and stored when not required for use and which may be readily opened and set up over the seat or seats of the automobile.

Other objects will appear from the following description.

In order that the invention may be clearly understood, I have illustrated it in the accompanying drawings, in which—

Figure 1 is a perspective view showing the two seats of an automobile with the frame open and extending over said seats. Fig. 2 is also a perspective view, but showing the frame folded and stored. Fig. 3 is a detail view of one of the supports secured to the front seat. Fig. 4 is a detail view showing a catch for holding the rear standards locked when in their open position. Fig. 5 is a view of one of the nuts for securing the front standards. Fig. 6 is a view showing a modification of the frame adapted to cover only one of the seats. Fig. 7 is a perspective view showing the canopy folded. Fig. 8 is a detail view of one of the parts.

The part marked A on the drawings represents the upper part of an automobile. B is the front seat, and C the rear seat, thereof. D is the dashboard or front part of the automobile.

E represents the canopy-frame.

Referring now to the frame, the parts marked 1 are supports, preferably made of metal, which are secured to the rear seat on each side thereof. 2 represents standards pivoted to each of these supports at the point marked 3. Each of these standards is provided with a pivot 4, so that the said standards may be folded.

5 is a catch adapted to hold the standards secure in their open position. This catch consists of a plate $5^a$, secured to the upper portion of the standard. This plate has a hole $5^b$ therein, into which fits the pin $5^c$, secured to the lower end of the standard, as clearly shown in Fig. 4 of the drawings. 6 represents other supports which are secured in each side of the rear seat near the front part thereof. To each of these supports is pivoted the standard 7. Each of these supports, near the lower portion thereof, is provided with holes 8.

9 represents supports secured to each side of the front seat in the manner shown by Fig. 3 of the drawings. Each of these supports consists of a flat piece of metal bent at right angles and secured to the body portion of the seat. The upper ends of these supports are turned inwardly at right angles $9^a$. These inturned portions are provided with a slot $9^b$. These supports are also provided with holes $9^c$.

10 represents standards which are adapted to be held by the support 9 when the frame is raised. The lower ends of these supports are turned outwardly at right angles, as shown at $10^a$. These turned ends are provided with screw-threads. These outturned ends pass through holes $9^c$ in the support, the body of the support fitting into the slot $9^b$ of said support.

11 represents nuts which fit on the screw-thread end of the standard 10 to hold it securely to the support. Each of these nuts is provided with a pivoted handle $11^a$, which hangs downwardly and prevents the nut from being jarred off the end of the support.

12 represents pivoted frames secured to the front board D of the automobile. These frames are pivoted so that they will fold inwardly, and the pivots are so arranged vertically that when folded one of these frames will lie over the other, as clearly shown in Fig. 2 of the drawings.

13 is a board which extends across the upper end of these frames. This board and the frames are provided with catches 14 to secure the parts together. In and between the frames 12 slides a frame of glass 15. 16 represents lugs secured to the rear edge of the board 13 at the ends thereof.

17 represents braces, the forward ends of which are pivoted to the lugs 16, and the rear ends are pivoted to diagonal braces 18. The lower ends of each of these diagonal braces are pivoted to the standard 10 at the point 19. 20 represents other braces, each of which is pivoted at its forward end to the upper end of the diagonal brace 18. The rear end of this brace is pivoted to the upper end of the standard 10. 21 and 22 are other braces, each of which extends between the upper end of the standards 7 and 10 and 2 and 7, respectively. All of these braces 17, 20, 21, and 22 are provided near their center with pivots, so that they may be folded in the manner indicated in Fig. 2 of the drawings.

23 is a cross-brace connecting the upper ends of the standards 10. 24 is a similar brace connecting the upper ends of the standards 7, and 25 is the same kind of a brace connecting the upper ends of the standards 2.

Secured to the rear of the front seat, near the center thereof, is a support 26. This support has a hole 27 therethrough, into which vertically passes the standard 28. This standard is bifurcated at its upper end, as shown at $27^a$. In this bifurcated upper end fits the cross-brace 23.

29 is a nut which passes through the support 26 to hold the standard in its raised position.

Suppose that the standard is raised in the position shown in Fig. 1 and it is desired to fold and restore it to the position shown in Fig. 2. The glass 15 is lowered into pockets provided for that purpose. The catches 14 are released, so that the frames 12 will be folded into the position shown in Fig. 2. The braces 17 are then folded, bringing the board 13 against the upper end of the diagonal braces 18. The braces 20 are then folded to bring all the parts against the cross-brace 23. The nut 29 is then released and the standard 28 dropped to the position shown in Fig. 2. The nuts 11 are then taken off the ends of the standards 10, and the said standards are removed from the support 9. The braces 21 are folded, so as to bring all the parts against the cross-brace 24. The lower ends of the standards 10 are then passed through the holes 8 in the standard 7, and the nuts 11 are placed on the screw-threaded ends of said standards 10 to secure the standards to the standard 7. The braces 22 are then folded, so that all the front part of the frame will lie against the cross-brace 25. The catch 5 is now released and the standard 2 is folded and all of the parts brought to the position shown in Fig. 2.

In Fig. 6 I have shown a modification, in which the frame is to cover only one seat. The rear supports and standards are exactly like those shown in Fig. 1, and the same is true of the cross-brace 25 and the horizontal braces 22. The standard 7, however, is not provided with a hole 8. In this construction the supports and standards on the front seat are different from those in the other views. In this modification I provide two standards $10^a$, which are pivoted to the rear of the front seat at the point marked $10^b$. The upper ends of these supports are turned, as shown at $10^c$, to provide a seat $10^d$ for the cross-brace 23. This cross-brace 23, near the ends thereof, has secured thereto a metal plate $23^a$, which is screw-threaded and into which a screw-threaded nut $10^e$ passes to secure the support 10 and the said cross-brace 23. All is clearly shown in Fig. 8 of the drawings. The longitudinal braces $21^a$ are formed into frames 27 and 28. Suppose this modified frame is raised, as shown at Fig. 6, and it is desired to fold it. The nut $10^e$ is moved so as to release it from the plate $23^a$ of the cross-brace 23. The standards $10^a$ are then folded on their pivots $10^b$ to the position shown in Fig. 2. The frame 28 is then folded underneath the frame 27. The braces 22 are folded and the notches 5 released, so that the support 2 can be folded inwardly, and all of the parts are then lowered to the position shown in Fig. 7.

As many changes could be made in the above construction and many apparently widely-different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention which, as a matter of language, might be said to fall therebetween.

Having described my invention, what I claim as new, and desire to secure by Letters Patent, is—

1. In an automobile-canopy frame, a dashboard, frames pivoted to said dashboard, a pane of glass between said frames, said frames adapted to support the said glass, and between which said glass may slide, the said frames being pivoted so that when folded one will lie over the other, a board extending across the upper ends of the frame, and catches adapted to secure the frames of the board together.

2. In an automobile-canopy frame, a support having the upper end thereof turned at right angles, said inturned portion being provided with a slot, and the upper part of said support being also provided with holes, a standard adapted to fit into said slot, and having outturned ends provided with screw-threads, and a nut having a weighted handle adapted to fit on said screw-threaded end of the standard, as and for the purpose set forth.

3. In an automobile-canopy frame, supports, standards secured to the said supports, said standards being pivoted, catches secured to said supports at or near the pivot and adapted to securely hold the standard in its raised position to the other supports, standards pivoted to said supports, said standards having a hole therein, other supports secured to the front seat of the automobile, having the upper end thereof turned at right angles, the turned ends being provided with slots, the upper portions of these supports also being provided with holes, standards adapted to fit in said slots and having turned ends adapted to fit in said holes, a nut adapted to be screwed to the end of the standard, a diagonal brace pivoted to said standard, another support secured to the front seat of the automobile, a dashboard, pivoted frames secured to the said dashboard, said frames being hinged, the hinges being so placed that the frames will lie one over the other when folded, a pane of glass adapted to be moved vertically between and be guided by said frames, a board connecting the upper ends of the frames, catches for securing the parts of the upper ends of the frames together, pivoted braces extending from the said board to the diagonal braces, and from the diagonal braces to the other braces, cross-braces connecting all of the braces except the diagonal braces, and a support for the front cross-brace, substantially as set forth.

In testimony whereof I affix my signature in the presence of two witnesses.

LEWIS C. SHIPLEY.

Witnesses:
JAMES REYNOLDS,
EMIL HRONESH.